United States Patent
Shintani (10) Patent No.: US 9,008,499 B2
(45) Date of Patent: Apr. 14, 2015

(54) OPTICAL VIEWFINDER

(71) Applicant: Panasonic Corporation, Osaka (JP)

(72) Inventor: Dai Shintani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/023,407

(22) Filed: Sep. 10, 2013

(65) Prior Publication Data

US 2014/0293111 A1  Oct. 2, 2014

(30) Foreign Application Priority Data

Mar. 26, 2013  (JP) .................................. 2013-065111

(51) Int. Cl.
  *H04N 5/232*  (2006.01)
  *G03B 13/04*  (2006.01)
  *G03B 13/12*  (2006.01)

(52) U.S. Cl.
  CPC ............ *H04N 5/23293* (2013.01); *G03B 13/04* (2013.01); *G03B 13/12* (2013.01)

(58) Field of Classification Search
  CPC ....................................................... G03B 13/12
  USPC ................ 396/378, 84, 141, 148; 348/333.09
  See application file for complete search history.

(56) References Cited

U.S. PATENT DOCUMENTS

| | | | | |
|---|---|---|---|---|
| 3,868,711 A | * | 2/1975 | Sekida et al. | 396/373 |
| 4,165,933 A | * | 8/1979 | Sunouchi et al. | 396/354 |
| 4,833,494 A | * | 5/1989 | Ohsawa | 396/296 |
| 4,945,372 A | * | 7/1990 | Higuchi et al. | 396/61 |
| 5,161,025 A | | 11/1992 | Nakao | |
| 5,179,478 A | * | 1/1993 | Aoki | 386/200 |
| 5,225,927 A | * | 7/1993 | Nozaki et al. | 359/355 |
| 5,495,367 A | * | 2/1996 | Morooka | 359/674 |
| 5,548,334 A | * | 8/1996 | Ichiyoshi | 348/341 |
| 5,625,487 A | * | 4/1997 | Hasushita et al. | 359/432 |
| 5,739,956 A | * | 4/1998 | Ohtake | 359/643 |
| 6,041,195 A | * | 3/2000 | Honda et al. | 396/429 |
| 6,240,257 B1 | * | 5/2001 | Nishizawa et al. | 396/287 |
| 6,327,440 B1 | * | 12/2001 | Taniguchi et al. | 396/436 |
| 7,092,030 B1 | * | 8/2006 | Abe et al. | 348/374 |
| 7,630,626 B2 | * | 12/2009 | Senba et al. | 396/383 |
| 7,978,465 B2 | * | 7/2011 | Osaka et al. | 361/679.22 |

(Continued)

FOREIGN PATENT DOCUMENTS

| | | |
|---|---|---|
| JP | 60-074134 U | 4/1985 |
| JP | 03-292067 A | 12/1991 |

(Continued)

*Primary Examiner* — Rodney Fuller
*Assistant Examiner* — Linda B Smith
(74) *Attorney, Agent, or Firm* — McDermott Will & Emery LLP (57) ABSTRACT

An optical viewfinder is configured to be attached to a camera body with an interchangeable lens. The optical viewfinder includes: a Keplerian viewfinder optical system 301 including a scalable objective lens group 330; a stepping motor 305 configured to drive the objective lens group 330 along an optical axis; and a control circuit configured to control driving of the stepping motor 305 based on a result of detection by a PI 306. When a variable focal length lens (an interchangeable lens) is attached to a camera body, the control circuit controls driving of the stepping motor 305 in accordance with a focal length of the variable focal length lens and displays at least a photographing frame on an EVF panel 307.

11 Claims, 7 Drawing Sheets

(56) References Cited

U.S. PATENT DOCUMENTS

| | | | |
|---|---|---|---|
| 2002/0159772 A1* | 10/2002 | Saito | 396/373 |
| 2003/0179307 A1* | 9/2003 | Kawanishi et al. | 348/333.09 |
| 2005/0140813 A1 | 6/2005 | Wani | |
| 2006/0267882 A1* | 11/2006 | Hu et al. | 345/76 |
| 2008/0084484 A1* | 4/2008 | Ochi et al. | 348/222.1 |
| 2011/0122233 A1* | 5/2011 | Kasai et al. | 348/49 |

FOREIGN PATENT DOCUMENTS

| | | |
|---|---|---|
| JP | 06-022185 A | 1/1994 |
| JP | 2003-078785 A | 3/2003 |
| JP | 2005-107433 A | 4/2005 |
| JP | 2006-267380 A | 10/2006 |

\* cited by examiner

OPTICAL VIEWFINDER

CROSS-REFERENCE TO RELATED APPLICATION

This application claims priority to Japanese Patent Application No. 2013-065111 filed on Mar. 26, 2013, the entire disclosure of which is incorporated by reference herein.

BACKGROUND

The present disclosure relates to optical viewfinders capable of being attached to the bodies of cameras with interchangeable lenses capable of taking pictures of still or video images.

Japanese Patent Publication No. 2006-267380 proposes a means for obtaining a subject image through switching between an optical viewfinder (OVF) and an electronic viewfinder (EVF) in a single-lens reflex digital camera. In this publication, an image is formed by reflecting, on a mirror, a subject image transmitted through a taking lens, and then is subjected to secondary imaging near an observer with various combinations of a prism, a lens, and a mirror such that an enlarged object can be observed with an eyepiece lens. This publication also describes a means for obtaining a subject image by including an EVF panel at an optically equivalent distance to that of the surface of the secondary imaging described above and switching observation between the OVF and the EVF through driving of the mirror or a semitransparent mirror.

Japanese Patent Publication No. H06-22185 describes a camera-integrated reverse Galilean viewfinder separated from a camera lens and including a mirror and a semitransparent mirror through which an EVF panel can be observed. This configuration is intended to enable visual identification of a subject image from both of an OVF and an EVF.

SUMMARY

The present disclosure provides an optical viewfinder capable of being attached to the body of a camera with an interchangeable lens (which viewfinder will be hereinafter also referred to as an external optical viewfinder) and exhibiting excellent visual recognizability of a subject and enhanced followability of a moving object. The present disclosure also provides an external optical viewfinder that can adjust a focal length after exchange of lenses attached to the camera body.

The present disclosure further provides an external optical viewfinder allowing for parallax correction.

An example optical viewfinder according to the present disclosure configured to be attached to a camera body with an interchangeable lens includes: a Keplerian viewfinder optical system including a scalable objective lens group; a drive source configured to drive at least one objective lens of the objective lens group along an optical axis; a detector configured to detect a position of the at least one objective lens; a control circuit configured to control driving of the drive source based on a result of detection by the detector; an electric contact configured to be electrically coupled to the camera body; a visual field frame disposed on a focal plane of the objective lens group, and wider than a photographing frame of the interchangeable lens that is to be attached to the camera body; and a display device optically equivalent to the focal plane when viewed from an eyepiece lens of the camera and located at a position different from that of the visual field frame, wherein when a variable focal length lens is attached to the camera body as the interchangeable lens, the control circuit controls driving of the drive source to adjust a magnification of the objective lens group and displays at least the photographing frame on the display device, based on information on a focal length of the variable focal length lens received from the camera body through the electric contact.

In the optical viewfinder, the control circuit displays at least the photographing frame on the display device, and controls driving of the drive source to adjust the magnification of the objective lens group. Thus, a photographer can take a picture while checking a direct (real-image) subject image that has been transmitted through the objective lens group adjusted in accordance with the focal length of the interchangeable lens (the variable focal length lens) and a photographing frame of the interchangeable lens displayed on the display device, at the same time. Accordingly, the photographer can take a picture with excellent visual recognizability of a subject. In addition, since a subject image is checked with the optical viewfinder, high followability of a moving object can be achieved. Furthermore, since the visual field frame is wider than the photographing frame of the interchangeable lens, the periphery of the photographing frame can be observed, thereby enabling photographing with prediction of movement of a moving object, e.g., entering of the moving object into the photographing frame.

BRIEF DESCRIPTION OF THE DRAWINGS

FIGS. 4A-4C illustrate a main configuration of an optical viewfinder of the embodiment, where

DETAILED DESCRIPTION

Since the single-lens reflex digital camera of Japanese Patent Publication No. 2006-267380 is of a single-lens reflex type, a main mirror needs to be provided so as to be drivable between a taking lens and an imaging device. This configuration has a large flange focal length, thereby increasing cost as well as reducing the degree of freedom in optical design. In addition, secondary imaging requires a prism and a large number of mirrors and lenses, thereby significantly increasing cost as well as size.

In the camera of Japanese Patent Publication No. H06-22185, although the camera lens is a zoom type, an objective lens of the reverse Galilean viewfinder cannot enlarge a target region of a subject image, and merely shows a limited angle of view. On the other hand, the target region through an EVF can be enlarged. However, since the target region through the EVF is superimposed on an OVF showing a limited angle of view, an EVF display at a telephoto end is very small so that visual recognition is difficult and, in addition, matching between OVF and EVF images involves difficulties that are very difficult to completely remove, e.g., a difficulty in correcting a shift of an optical axis due to an error of the camera lens.

Referring now to the drawings, an embodiment of the present disclosure will be described in detail. Unnecessarily detailed description may be omitted. For example, well-known techniques may not be described in detail, and substantially identical configurations may not be repeatedly described. This is because of avoiding unnecessarily redundant description and easing the understanding of those skilled in the art.

An inventor of present disclosure provides the attached drawings and the following description so that those skilled in the art fully understand the present disclosure. Therefore, the drawings and the description are not intended to limit the subject matter recited in the claims.

Embodiment

An embodiment will be described with reference to FIGS. 1-5.

1. Configuration of Camera System

Figure 1:
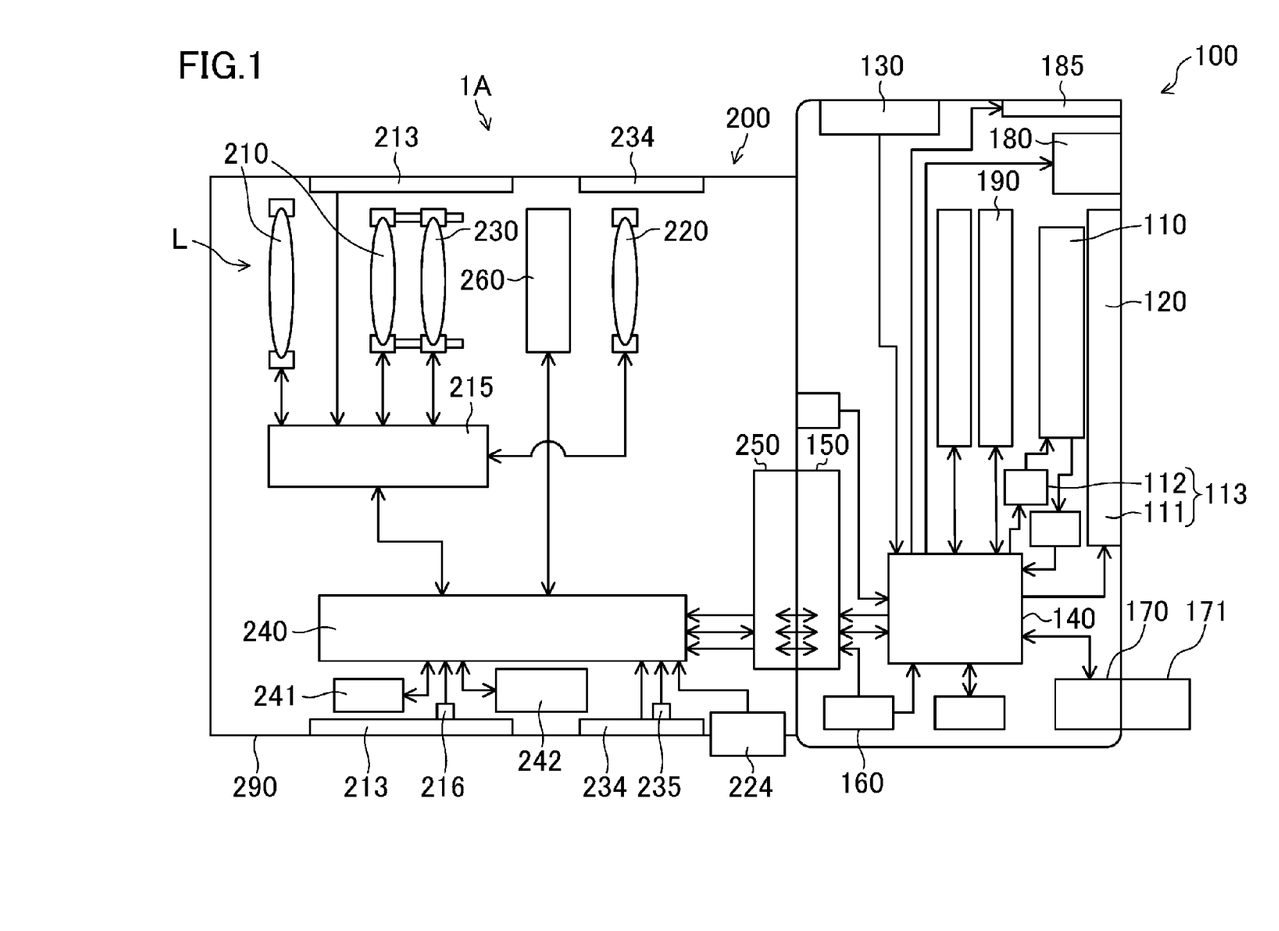
FIG. 1 is a block diagram illustrating a configuration of a camera system according to an embodiment.

FIG. 1 is a block diagram illustrating a configuration of a camera system according to an embodiment.

As illustrated in FIG. 1, a camera system 1A is a digital camera system with an interchangeable lens, and is equipped with a general-purpose accessory shoe 185 and a socket 180. The camera system 1A mainly includes a camera body 100 having a main function of the camera system 1A and a lens unit 200 as an interchangeable lens (a variable focal length lens) removably attached to the camera body 100. In the following description, the "front" refers to the subject side, and the "back" refers to the photographer side. The "photographer" herein refers to a user of the camera system 1A.

[1-1. Camera Body]

Figure 2:
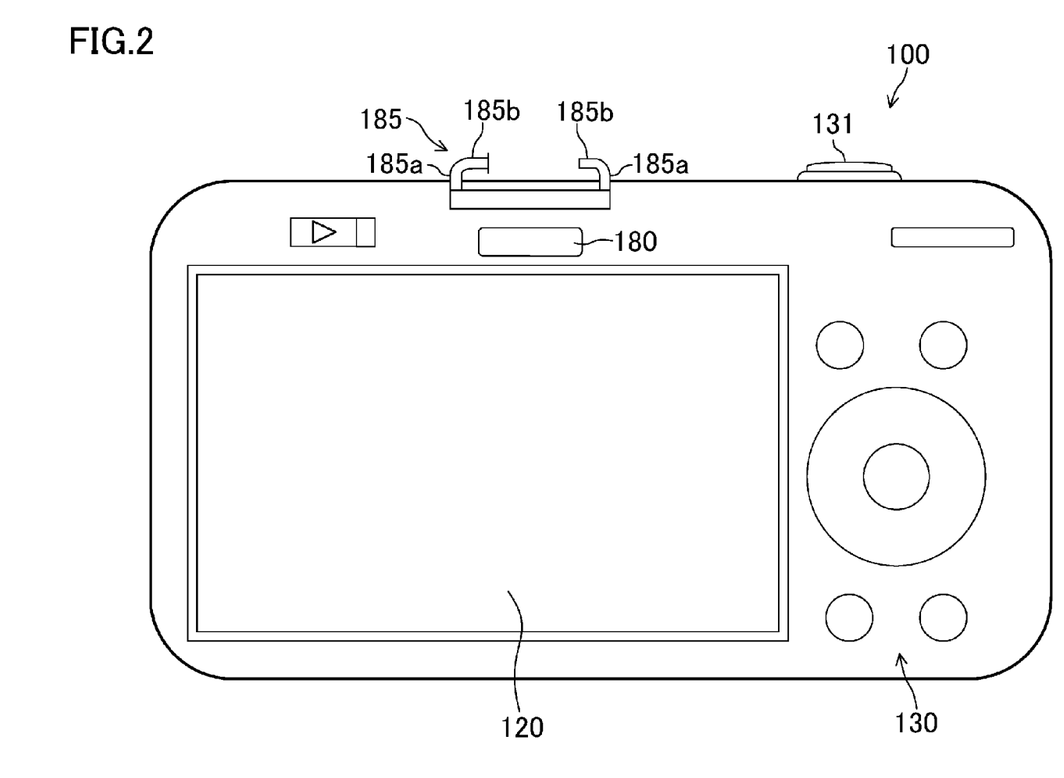
FIG. 2 is a back view of a camera body of the embodiment.
Figure 3:
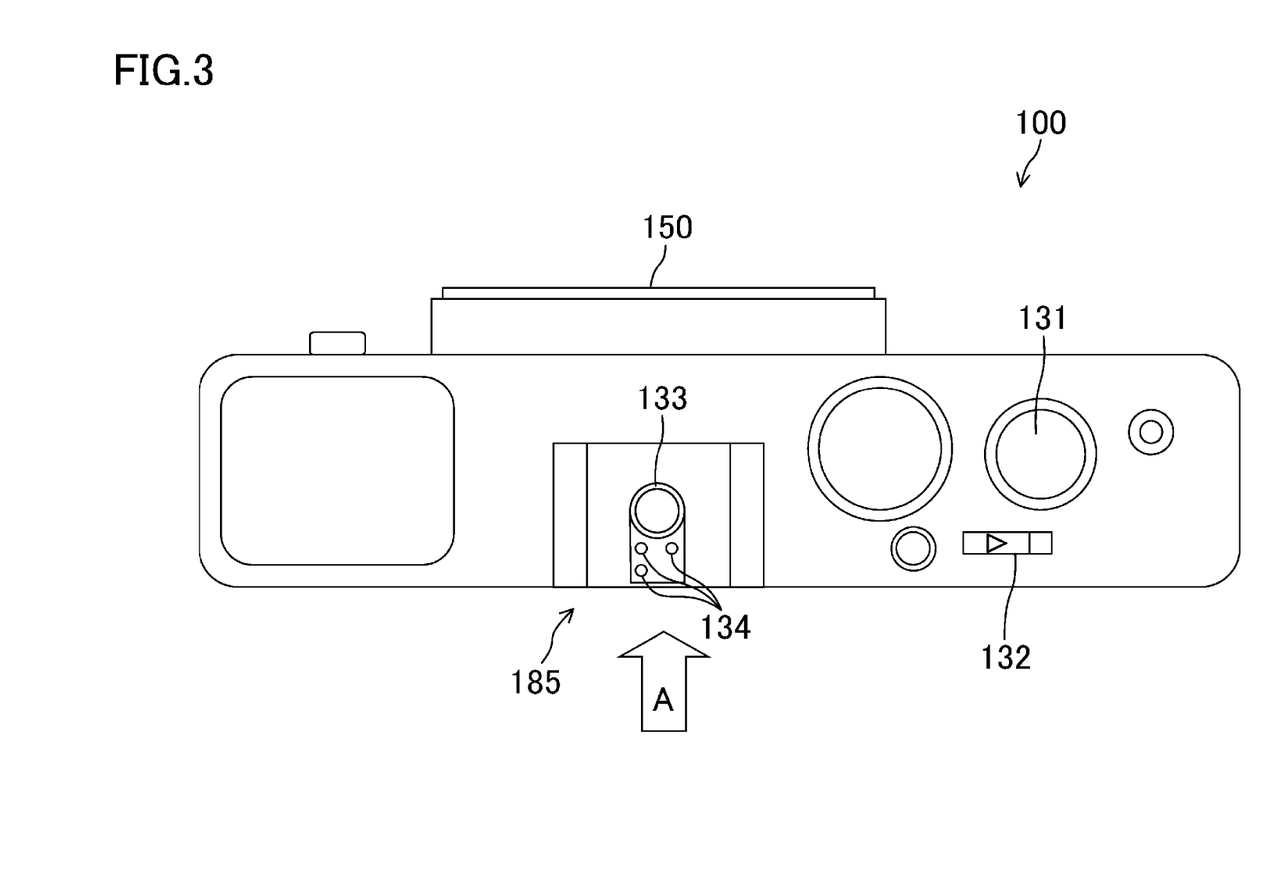
FIG. 3 is a top view of the camera body of the embodiment.

Referring to FIGS. 1-3, the configuration of the camera body 100 will be schematically described. FIG. 2 is a back view of the camera body 100. FIG. 3 is a top view of the camera body 100.

As illustrated in FIG. 1, the camera body 100 mainly includes a complementary metal oxide semiconductor (CMOS) image sensor 110, a CMOS circuit board 113, a main circuit board including a camera controller 140, a power supply 160, a card slot 170, and a focal-plane shutter 190. As illustrated in FIG. 2, the accessory shoe 185 is located on the top surface of the camera body 100, and an operation unit 130 for accepting operation by a user is provided on the top and back surface of the camera body 100. The back surface of the camera body 100 is provided with a camera monitor 120 and the socket 180 into which a plug 311, described later, is fitted. As illustrated in FIG. 3, a body mount 150 is provided on the front surface of the camera body 100.

The CMOS image sensor 110 (an example of an imaging device) converts, into image data, an optical image (hereinafter also referred to as a subject image) of a subject entering through the lens unit 200. The generated image data is digitized by an AD converter 111 of the CMOS circuit board 113. The image data digitized by the AD converter 111 is subjected to various types of image processing performed by the camera controller 140. The "various types of image processing" herein include gamma correction, white balance, spot correction, YC conversion, electronic zooming, joint photographic experts group (JPEG) compression, etc.

The CMOS circuit board 113 controls the CMOS image sensor 110. The CMOS circuit board 113 performs predetermined processing on image data output from the CMOS image sensor 110, and includes a timing generator 112 as well as the AD converter 111. The CMOS circuit board 113 controls driving of the imaging device and performs predetermined processing such as AD conversion on image data output from the imaging device.

The CMOS image sensor 110 operates based on a timing signal generated by the timing generator 112 of the CMOS circuit board 113. The CMOS image sensor 110 is controlled by the CMOS circuit board 113 and obtains still image data and video data. The obtained video data is also used for displaying a through-the-lens image. The still image data and the video data are examples of the above-described image data.

The through-the-lens image herein refers to an image that is included in video data and is not recorded on a memory card 171. The through-the-lens image is often a video image to be displayed on the camera monitor 120 in order to determine a composition of a video image or a still image.

The CMOS image sensor 110 can obtain a low-resolution video image, which is used as a through-the-lens image, and a high-resolution video image, which is used for recording. Examples of the high-resolution video image include a video image of an HD size (a size for high-definition television: 1920×1080 pixels). The CMOS image sensor 110 is an example of an imaging device that converts an optical image of a subject into an electronic image signal. The imaging device refers to a device including a photoelectric conversion device such as a CCD image sensor, as well as the CMOS image sensor 110.

The camera monitor 120 is, for example, a liquid-crystal display, and displays, for example, an image indicated by a display image data. The display image data is generated by the camera controller 140. The display image data is, for example, image data subjected to image processing, data for displaying, as an image, shooting conditions of the camera system 1A, an operation menu, etc. The camera monitor 120 can also selectively display a video image and a still image.

The camera monitor 120 is provided on the camera body 100. In this embodiment, the camera monitor 120 is located on the back surface of the camera body 100, but may be located at any position on the camera body 100. The camera monitor 120 is an example of a display unit provided on the camera body 100. The marking unit may be any unit that can display an image, such as an organic electro-luminescence (EL) panel, an inorganic EL panel, or a plasma display panel.

The operation unit 130 includes a release button 131 that receives a focal-plane shutter operation by the user and a power supply switch 132. The release button 131 and the power supply switch 132 are provided on the top surface of the camera body 100. The operation unit 130 only needs to receive operation by the user, and includes a button, a laver, a dial, a tough panel, etc.

The camera controller 140 controls each section of the camera body 100. The camera controller 140 receives an instruction from the operation unit 130. The camera controller 140 sends a signal for controlling the lens unit 200 to a lens controller 240 through the body mount 150 and a lens mount 250, and indirectly controls each section of the lens unit 200. That is, the camera controller 140 controls the entire camera system 1A.

The camera controller 140 controls the CMOS circuit board 113. Specifically, the camera controller 140 sends a control signal to the CMOS circuit board 113, and the CMOS circuit board 113 controls the CMOS image sensor 110 based on the received control signal. That is, the camera controller 140 controls the CMOS image sensor 110. The camera controller 140 obtains image data generated by the CMOS image sensor 110 and subjected to predetermined processing such as AD conversion by the CMOS circuit board 113, and performs further processing on this image data. Specifically, for example, the camera controller 140 generates display image data, video data for recording, etc. from image data processed by the CMOS circuit board 113.

The card slot 170 is configured to receive the memory card 171. The card slot 170 controls the memory card 171 based on a control signal from the camera controller 140. Specifically, the card slot 170 stores image data on the memory card 171. The card slot 170 outputs the image data from the memory card 171. The memory card 171 stores video data. The card slot 170 outputs the video data from the memory card 171.

The memory card 171 can store image data generated through image processing by the camera controller 140. For example, the memory card 171 can store an uncompressed RAW image file, a compressed JPEG image file, etc. The memory card 171 can output the image data or the image file previously stored therein through the card slot 170. The image data or the image file output from the memory card 171 is subjected to image processing by the camera controller 140. For example, the camera controller 140 performs extension processing on the image data or the image file from the memory card 171, and generates display image data.

The memory card 171 can further store video data generated through image processing by the camera controller 140. For example, the memory card 171 can store a video image file compressed according to H.264/AVC, which is a video image compression standard. The memory card 171 can output the video data or the video image file previously stored therein through the card slot 170. The video data or the video image file output from the memory card 171 is subjected to image processing by the camera controller 140. For example, the camera controller 140 performs extension processing on the video data or the video image file obtained from the memory card 171, and generates video data for display. Instead of the memory card 171, a storage unit fixed in the camera system 1A can store image data, an image file, etc., for example.

The power supply 160 supplies power for use in the camera system 1A to each section. The power supply 160 may be a dry battery or a rechargeable battery. The power supply 160 may be a unit that receives power from an external power supply through, for example, a power supply cord and supplies power to the camera system 1A.

The body mount 150 is configured to be engaged with the lens mount 250 so that the engaged unit of the body mount 150 and the lens mount 250 supports the lens unit 200. The body mount 150 has an electric contact (not shown), and when being engaged with the lens mount 250, is electrically connected through this electric contact to an electric contact (not shown) of the lens mount 250. In this manner, at least one of data or a control signal can be transmitted in both directions between the camera body 100 and the lens unit 200 through the body mount 150 and the lens mount 250.

The focal-plane shutter 190 is disposed in front of the CMOS image sensor 110. The focal-plane shutter 190 has a state in which light travelling from an optical system L, which will be described below, toward the CMOS image sensor 110 is blocked and a state in which light travelling from the optical system L toward the CMOS image sensor 110 is allowed to pass therethrough. The focal-plane shutter 190 controls an exposure time of the CMOS image sensor 110.

The accessory shoe 185 is a mechanical and electrical connection unit for attachment of an optical viewfinder 300, which will be described below, an external flash, an electronic viewfinder, etc. The accessory shoe 185 includes an X contact terminal 133 serving as an electronic contact, and a serial communication port 134 serving as a communication contact, and can send and receive, in both directions, at least one of data or a control signal to/from the equipment (e.g., the optical viewfinder 300) attached to the accessory shoe 185.

As illustrated in FIG. 2, the accessory shoe 185 includes a pair of side portions 185a projecting upward from the top surface of the camera body 100 and a pair of upper portions 185b continuous to the pair of side portions 185a and extending inward from the side portions 185a. The distance between the side portions 185a is slightly larger than the length of a connection part 360c of a leg attachment part 360 of the optical viewfinder 300, which will be described later. The opening of the pair of upper portions 185b is slightly wider than a supporter 360b of the leg attachment part 360. This configuration allows the leg attachment part 360 to be inserted into the accessory shoe 185 from the back toward the front of the camera (i.e., in the direction indicated by the arrow A in FIG. 3) to be attached thereto.

The X contact terminal 133 and the serial communication port 134 may serve as an X contact terminal for a flash device and a communication contact for the flash device, respectively. This configuration enables the use of an X contact terminal and a communication contact typically installed in an existing digital camera. Thus, new parts and new terminals (connection points) do not need to be additionally provided for the optical viewfinder of the present disclosure.

The socket 180 is provided below the accessory shoe 185 on the back surface of the camera body 100. A plug 311 of the optical viewfinder 300, which will be described later, is fitted into the socket 180 from the back surface toward the front of the camera (i.e., in direction indicated by the arrow A in FIG. 3), thereby electrically connecting the camera body 100 and the accessory shoe 185 to each other. The configurations of the socket 180 and the plug 311 are examples for electrically connecting the camera body 100 and the optical viewfinder 300 to each other.

The accessory shoe 185 may be a general-purpose hot shoe. Specifically, the optical viewfinder 300 of this embodiment can be installed in an imaging system except the camera system of this embodiment as long as the imaging system includes a general-purpose hot shoe and one of an X contact terminal, a serial communication port, or a socket.

[1-2. Lens Unit]

The lens unit 200 can be attached to the body mount 150 on the front surface of the camera body 100 through the lens mount 250 provided at the rearmost part, and form an optical image of a subject. Specifically, as illustrated in FIG. 1, the lens unit 200 includes the optical system L, a driver 215, the lens mount 250, a diaphragm unit 260, a lens controller 240, and a lens barrel 290.

The lens barrel 290 mainly houses the optical system L, the lens controller 240, the lens mount 250, the diaphragm unit 260, a DRAM 241, and a flash memory 242. The periphery of the lens barrel 290 is provided with a zooming ring 213, a focusing ring 234, and an optical image stabilizer (OIS) switch 224.

The optical system L includes: a zooming lens group 210 for changing the focal length of the optical system L; an OIS lens 220 for reducing a camera shake of a subject image formed by the optical system L on the CMOS image sensor 110; and a focus lens 230 allowing the optical system L to change focus conditions of a subject image on the CMOS image sensor 110.

The diaphragm unit 260 is a light-amount adjusting member that adjusts the amount of light being transmitted through the optical system L. Specifically, the diaphragm unit 260 includes a diaphragm blade (not shown) capable of partially shutting light rays being transmitted through the optical system L and a diaphragm driver (not shown) that drives the diaphragm blade.

The lens controller 240 controls the entire lens unit 200 based on a control signal transmitted from the camera controller 140. The lens controller 240 sends/receives a signal to/from the camera controller 140 through the lens mount 250 and the body mount 150.

In the case of a lens unit capable of performing electric zooming, the driver 215 adjusts the position(s) of the zooming lens group 210, the OIS lens 220, and/or focus lens 230, based on the control signal. The driver 215 may adjust the position(s) of the zooming lens group 210, the OIS lens 220, and/or the focus lens 230 with an actuator or a mechanical mechanism.

The zooming ring 213 is a cylindrical member for adjusting the focal length, and is capable of rotating on the outer periphery of the lens barrel 290. A zooming location detector 216 detects the focal length with the rotation of the zooming ring 213.

The focusing ring 234 is a cylindrical member, and is capable of rotating on the outer periphery of the lens barrel 290. The focusing ring 234 operates focused conditions of a subject image formed on the CMOS image sensor 110 by the optical system. With the rotation of the focusing ring 234, a focus location detector 235 detects the location of the focus lens 220.

The OIS switch 224 is an example of an operation unit for operating an OIS. When the OIS switch 224 turns off, the OIS lens 220 does not operate. On the other hand, when the OIS switch 224 turns on, the OIS lens 220 becomes operable.

2. Configuration of Optical Viewfinder

Figures 4A, 4B, 4C:
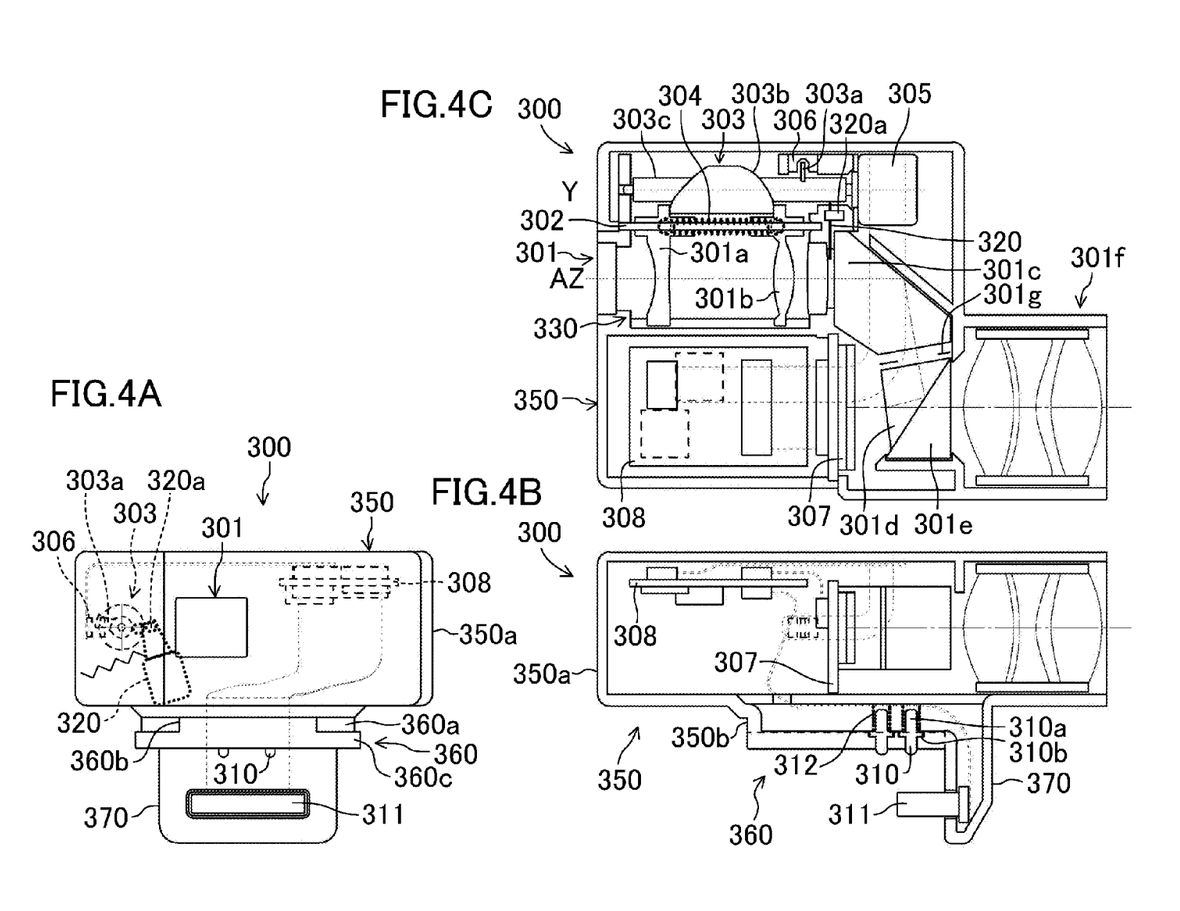
FIG. 4A is a front view.
FIG. 4B is a side view.
FIG. 4C is a top view.

FIGS. 4A-4C illustrate a main configuration of the optical viewfinder 300. FIG. 4A is a front view, FIG. 4B is a side view, and FIG. 4C is a top view.

As illustrated in FIG. 4C, the optical viewfinder 300 mainly includes: a viewfinder optical system 301 including a scalable objective lens group 330; a stepping motor 305 as a drive source for driving the objective lens group 330; a circuit board 308 equipped with, for example, a control circuit (e.g., a microcomputer) for controlling driving of the stepping motor 305; a cam shaft 303 configured to be rotatable about a rotation shaft (Y) extending in parallel with an optical axis (AZ); a photointerrupter (hereinafter also referred to as a PI) 306 serving as a detector; a light-shield plate 320, an EVF panel 307, and an accessory housing 350.

The viewfinder optical system 301 includes an objective lens group 330, a roof prism 301c, a visual field frame 301g (a focal plane), a first prism 301d, a second prism 301e, and an eyepiece lens group 301f. The visual field frame 301g is disposed on the focal plane of the objective lens group 330, specifically between the roof prism 301c and the first prism 301d. The aperture of the visual field frame 301g is larger than that of the photographing frame of the taking lens.

The cam shaft 303 includes: a shaft 303c in the shape of a cylindrical column; an encoder blade 303a projecting perpendicularly outward from the shaft 303c toward the PI 306 and configured to be used for detecting a reference position with the PI 306; and an end cam 303b that is cylindrical, is concentric with the shaft 303c, and has an inner diameter substantially equal to the outer diameter of the shaft 303c and an outer diameter larger than that of the shaft 303c. Corners of the end cam 303b at both ends in the rotation shaft (Y) direction are partially cut out to be sloped at predetermined angles from the both ends toward the middle, in the rotation shaft direction, of the end cam 303b. The shaft 303c, the encoder blade 303a, and the end cam 303b integrally rotate about the rotation shaft (Y).

The objective lens group 330 includes a first zoom lens 301a and a second zoom lens 301b, and moves on the optical axis (AZ) to change the size of the subject image (which operation will be hereinafter referred to as scaling operation). Specifically, the first zoom lens 301a and the second zoom lens 301b are biased to attract each other on the optical axis (AZ) by a bias spring 304 attached to a guide shaft 302 disposed in parallel with the optical axis (AZ). The first and second zoom lenses 301a and 301b sandwich the both ends, in the optical axis (AZ) direction, of the end cam 303b.

The stepping motor 305 is directly coupled to the shaft 303c of the cam shaft 303, and drives the shaft 303c so that the shaft 303c rotates about the rotation shaft (Y). This rotation causes the end cam 303b and the shaft 303c of the cam shaft 303 to rotate integrally. Accordingly, the first and second zoom lenses 301a and 301b move along the slopes of the end cam 303b, and consequently, move on the optical axis (AZ). As a drive source, a motor except a stepping motor may be used.

The encoder blade 303a is configured to rotate integrally with the shaft 303c of the cam shaft 303. When the objective lens group 303 is at a reference position, the encoder blade 303a is located between a light emission part and a light reception part of the photointerrupter 306. With this configuration, it is determined whether the objective lens group 330 (i.e., the first and second zoom lenses 301a and 301b) is at the reference position or not.

The light-shield plate 320 is rotatably attached to a light-shield plate rotation shaft 320a, and moves with rotation about the light-shield plate rotation shaft 320a between a light-shield position and a retracted position. The light-shield position is a position at which the light-shield plate 320 blocks passage of light between the objective lens group 330 and the roof prism 301c. The retracted position is a position at which the above-described light is allowed to pass therethrough.

Specific examples of the configuration and operation of the light-shield plate 320 will be described. Rotation of the cam shaft 303 causes the objective lens group 330 of the optical viewfinder 300 to be located at a telephoto end or a wide angle end, and then further rotation of the cam shaft 303 causes the light-shield plate rotation shaft 320a to rotate so that the light-shield plate 320 is inserted in front of the roof prism 301c at the light-shield position. On the other hand, while the cam shaft 303 causes the objective lens group 330 to move from the telephoto end to the wide angle end, the light-shield plate 320 moves to the retracted position. FIG. 4A illustrates an example in which the light-shield plate 320 is at the retracted position.

The first prism 301d and the second prism 301e are triangular prisms, and the side surfaces at longer sides of the bottom surfaces thereof are joined together. The eyepiece lens group 301f moves in the direction orthogonal to the optical axis (AZ) to adjust diopter.

The EVF panel 307 is disposed at a position at which display surface is optically equivalent to the above-described focal plane when viewed from the eyepiece lens.

As illustrated in FIGS. 4A and 4B, the optical viewfinder 300 further includes: a plurality of serial communication contact points 310 serving as electric contacts; a plurality of bias springs 312 for biasing the serial communication contact points 310; and a plug 311.

The accessory housing 350 includes a first housing part 350a and a second housing part 350b.

The first housing part 350a mainly houses the viewfinder optical system 301, the stepping motor 305, the circuit board 308, the cam shaft 303, the photointerrupter 306, the light-shield plate 320, and the EVF panel 307.

The second housing part 350b is integrally formed with the first housing part 350a, and projects downward from the first housing part 350a. The second housing part 350b includes the leg attachment part 360 configured to be attached to the accessory shoe 185 and a plug attachment part 370 integrally formed with the leg attachment part 360 and extending downward from the leg attachment part 360.

As illustrated in FIG. 4A, the leg attachment part 360 includes: the supporter 360b projecting downward from the bottom surface of the first housing part 350a; the connection part 360c integrally formed with, and provided on the bottom of, the supporter 360b and having a larger width in the transverse direction, in FIG. 4A, than that of the supporter 360b; and a stopper 360a provided on a rear portion of the connection part 360c and connecting the connection part 360c to the first housing part 350a to each other. When the leg attachment part 360 is inserted in the accessory shoe 185, the rear end of the accessory shoe 185 is stopped by the stopper 360a such that the optical viewfinder 300 is fixed to the camera body 100.

Each of the serial communication contact points 310 is made of a conductive material, has a cylindrical column shape, and includes a cylindrical column part 310a having a rounded corner on the end surface in the axial direction. A projection 310b perpendicularly projecting from the axial center of the cylindrical column part 310a is integrally formed with the cylindrical column part 310a.

The connection part 360c is located at a position corresponding to the serial communication port 134 of the camera body 100, and has a plurality of (e.g., three) holes each of which has an outer diameter slightly larger than the outer diameter of the cylindrical column part 310a. The upper surface of the connection part 360c has grooves whose centers coincide with that of the holes of the connection part 360c and whose outer diameters slightly larger than those of the projections 310b. These grooves are continuous to the holes of the connection part 360c.

Each of the serial communication contact points 310 is inserted in an associated one of the holes of the connection part 360c from above, and is biased downward by an associated one of the bias springs 312. This configuration ensures electrical connection of the serial communication contact points 310 to the respectively associated serial communication ports 134 when the leg attachment part 360 is inserted in the accessory shoe 185.

The plug 311 is configured to be inserted in the socket 180 of the camera body 100. Specifically, the plug 311 is disposed at a position corresponding to the socket 180 of the plug attachment part 370, and the front end thereof in the insertion projects forward. When the leg attachment part 360 is attached to the accessory shoe 185, the plug 311 is fitted into the socket 180 of the camera body 100 to electrically connect the camera body 100 and the optical viewfinder 300.

3. Operation

[3-1. Attachment of Lens Unit to Camera Body]

Operations of the camera body 100 and the lens unit 200 when the lens unit 200 is attached to the camera body 100 will be described with reference to FIG. 1. In the following description, the lens unit 200 is a lens unit capable of performing electric zooming or manual zooming.

The lens controller 240 receives positional information on the optical system L detected by a sensing portion included in the driver 215, and sends the received information to the camera controller 140. The camera controller 140 performs processing on the received positional information, and sends a control signal to the lens controller 240. The lens controller 240 receives the control signal from the camera controller 140, and sends the control signal to the driver 215. Based on the control signal, the driver 215 adjusts the position(s) of the zooming lens group 210, the OIS lens 220, and/or the focus lens 230.

The camera controller 140 instructs operation of the diaphragm unit 260 based on the amount of light received by the CMOS image sensor 110, setting of a shooting mode (e.g., still image shooting or video image shooting), information on whether operation in which setting of the aperture value has priority or not, etc. In this instruction, the lens controller 240 relays the instruction from the camera controller 140 to the diaphragm unit 260.

In the above-described control, the lens controller 240 uses a DRAM 241 as a working memory. The flash memory 242 stores a program or a parameter for use in control of the lens controller 240.

[3-2. Attachment of Optical Viewfinder to Camera Body]

Operations of the camera body 100 and the optical viewfinder 300 when the optical viewfinder 300 is attached to the camera body 100 with the lens unit 200 being attached to the camera body 100 will be described with reference to FIG. 5.

The camera controller 140 (indicated as an IMAGING APPARATUS ENGINE in FIG. 5) sends positional information on the optical system L received from the lens controller 240 of the lens unit 200 to the microcomputer 308a serving as a control circuit, through the serial communication port 134 (indicated as a FLASH CONTROL in FIG. 5) and the serial communication contact point 310 of the optical viewfinder 300. The microcomputer 308a detects a focal length of the objective lens group 330 based on a signal from a zoom encoder (not shown) of the optical viewfinder 300. Based on the received positional information on the optical system L and the focal length information on the objective lens group 330, the microcomputer 308a sends a drive control signal to the stepping motor 305 (indicated as a MOTOR in FIG. 5).

Based on the drive control signal, the stepping motor 305 drives the cam shaft 303 so that the cam shaft 303 rotates, and causes the objective lens group 330 to move along the optical axis (AZ). The stepping motor 305 can be subjected to an open control while receiving a power supply.

The photointerrupter 306 is used to determine the reference position when the optical viewfinder 300 is placed on the camera body 100. Specifically, when detecting that the optical viewfinder 300 is attached to the camera body 100, the microcomputer 308a receives a position detection signal from the PI 306, and determines whether the objective lens group 330 is at the reference position or not. When the power supply to the optical viewfinder 300 is cut off, the microcomputer 308a may drive the stepping motor 305 such that the objective lens group 330 returns to the reference position.

The power is supplied from the camera body 100 to the optical viewfinder 300. Specifically, a power supply voltage is supplied from the camera controller 140 to a DC-to-DC converter 308b through the socket 180 and the plug 311 of the optical viewfinder 300. The optical viewfinder 300 may receive, through the socket 180 and the plug 311, display image data for use in display on the EVF panel 307 transmitted from the camera controller 140.

Figure 5:
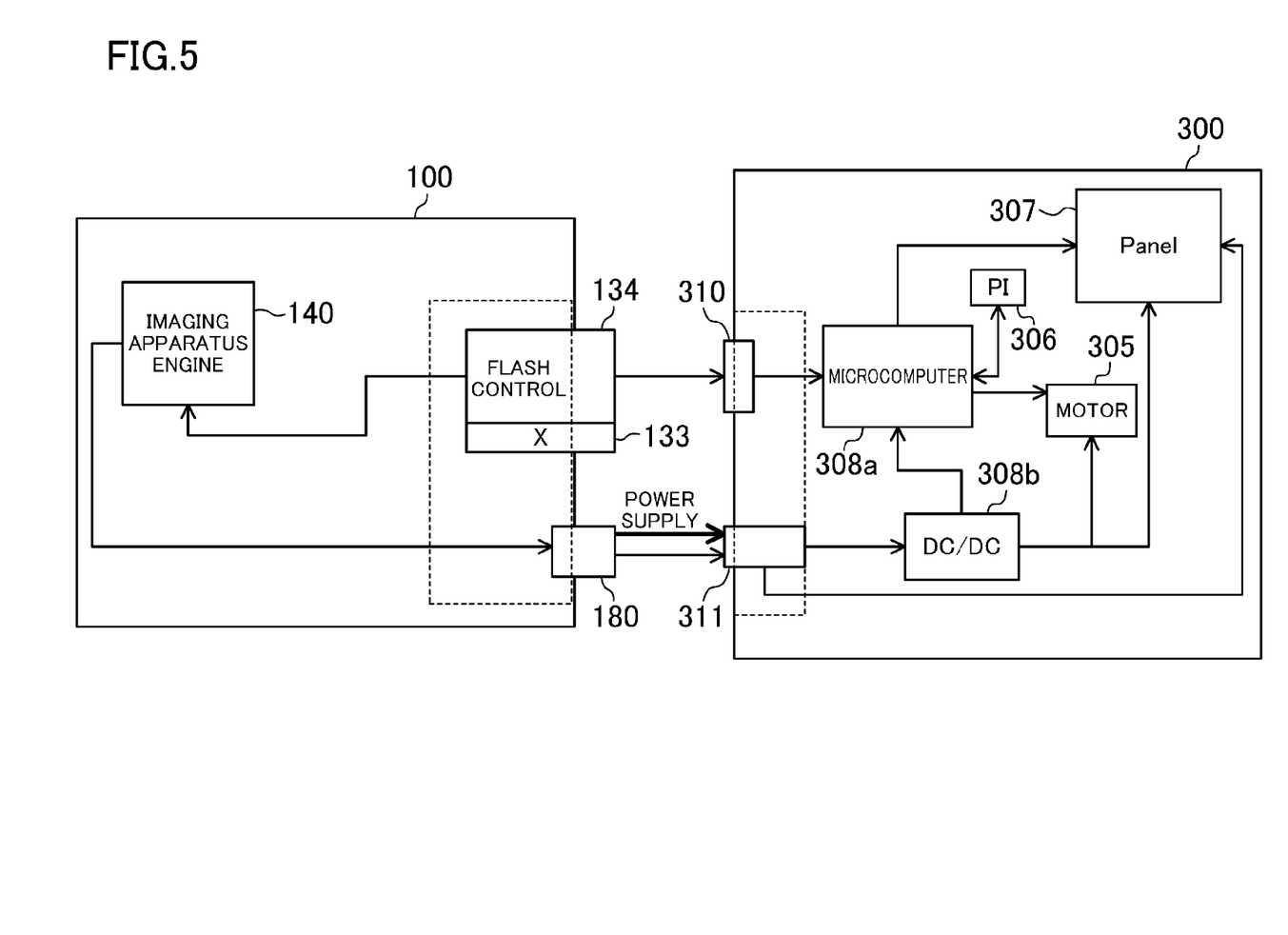
FIG. 5 illustrates operations of the camera body and the optical viewfinder of the embodiment.

The DC-to-DC converter 308b performs DC-to-DC conversion on the power supply voltage from the camera controller 140, and supplies the converted voltage to the microcomputer 308a, the stepping motor 305, and the EVF panel 307 (indicated as PANEL in FIG. 5). This configuration enables the optical viewfinder 300 to be attached to the camera body 100 for actual use even in a situation where a power supply voltage output from the camera body 100 differs from a power supply voltage to be supplied to, for example, the microcomputer 308a of the optical viewfinder 300, for example. The microcomputer 308a supplies a power supply voltage to the photointerrupter 306.

In a situation where a power supply voltage supplied from the camera controller 140 is equal to a power supply voltage to be used in the optical viewfinder 300, the DC-to-DC converter 308b does not need to be provided. The DC-to-DC converter 308b may receive a power supply voltage through the X contact terminal 133 for a flash device.

When the lens unit 200 is attached to the camera body 100 with the optical viewfinder 300 being attached to the camera body 100, the camera body 100 and the optical viewfinder 300 perform operations identical or similar to those described above.

[3-3. Zoom Operation (1) in Shooting]

Operation when a photographer, for example, performs zoom operation will be described. In the following description, a range of a focal length (hereinafter referred to as also simply referred to as a focal length range) that is capable of being set by the zooming lens group 210 of the lens unit 200 is narrower than a focal length range that is capable of being set by the objective lens group 330 of the optical viewfinder 300. The following description refers to, for example, a case where the objective lens group 330 copes with a 5× zoom, and the zooming lens group 210 copes with 3× zoom.

Rotation operation of the zooming ring 213 of the lens unit 200 by, for example, the photographer causes the zooming location detector 216 to detect a focal position, and sends a detection result to the lens controller 240. The lens controller 240 sends a control signal for adjusting the position of, for example, the zooming lens group 210, to the driver 215. The driver 215 causes the position of, for example, the zooming lens group 210 to move, and adjust the magnification of the zooming lens group 210. The lens controller 240 also sends the control signal (including information on the focal length) that has been sent to the driver 215, to the camera controller 140 of the camera body 100.

The camera controller 140 sends at least one (hereinafter referred to as a selected control signal) of a control signal received from the lens controller 240 and including information on the focal length (hereinafter also simply referred to as a control signal), or a photographing frame signal indicating a photographing frame that is an actually photographed picture frame created based on display image data and a control signal, to the microcomputer 308a of the optical viewfinder 300 through the serial communication ports 134 and the serial communication contact points 310.

The microcomputer 308a sends a drive control signal to the stepping motor 305 based on a selected control signal received from the camera controller 140. Based on the drive control signal, the stepping motor 305 drives the cam shaft 303 so that the cam shaft 303 rotates, causes the objective lens group 330 to move along the optical axis (AZ), and adjusts the magnification of the objective lens group 330.

Based on the received selected control signal, the microcomputer 308a displays at least a photographing frame on the EVF panel 307. For example, the microcomputer 308a may display an icon, shooting conditions of, e.g., a shutter speed, setting of the diaphragm, and a shooting mode, as well as the photographing frame. For example, the microcomputer 308a may selectively display part of the icon, the shooting conditions, the setting of the diaphragm, and the shooting mode, as well as the photographing frame. At this time, the microcomputer 308a outputs no image data to the EVF panel 307.

In the manner described above, the photographer can take a photograph while checking a subject image incident by way of the viewfinder optical system 301 through the eyepiece lens group 301f and a photographing frame.

Figure 6A:
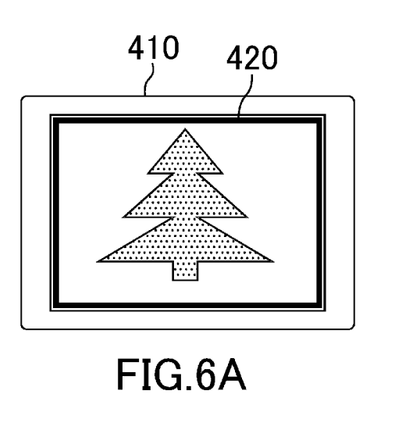
FIGS. 6A-6C illustrate displays on photographing frames in display frames in the embodiment.
Figure 6B:
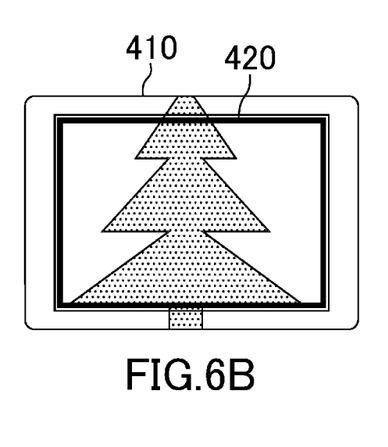
Figure 6C:
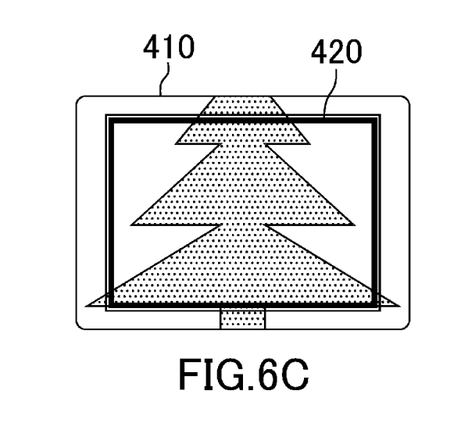

At this time, since the visual field frame 301g of the optical viewfinder 300 is wider than the photographing frame of the lens unit 200, the region of a display frame 410 visible to the photographer through the eyepiece lens group 301f of the optical viewfinder 300 extends off the region of a photographing frame 420, as illustrated in FIGS. 6A-6C. When the zooming lens group 210 performs zoom operation, the display frame 410 also displays the photographing frame 420 having the same width and the same height before and after the zoom operation (see FIGS. 6A-6C).

This configuration can synchronize the focal length of the zooming lens group 210 and the focal length of the objective lens group 330, and display the photographing frame 420 at a predetermined location in the display frame 410. In this manner, the photographer can take a photograph while checking a subject image (an optical image) of an OVF at the zoom position set with the zooming ring 213 of the lens unit 200 and the photographing frame 420 through the eyepiece lens group 301f of the optical viewfinder 300.

[3-4. Zoom Operation (2) in Shooting]

Another operation when the photographer, for example, performs zoom operation will be described. In the following description, a focal length range that is capable of being set by the objective lens group 330 of the optical viewfinder 300 is narrower than a focal length range that is capable of being set by the zooming lens group 210 of the lens unit 200. The following description refers to, for example, a case where the objective lens group 330 copes with a 5× zoom, and the zooming lens group 210 copes with 10× zoom.

First, the focal length range that is capable of being set by the objective lens group 330 is identical or similar to that in "Zoom Operation (1) in Shooting." That is, the photographer can check the zoom position set with the zooming ring 213 of the lens unit 200 through the eyepiece lens group 301f of the optical viewfinder 300.

Next, when the zoom operation exceeds the upper limit of the focal length range that is capable of being set by the objective lens group 330, the microcomputer 308a detects this state based on a control signal received from the camera controller 140, and performs predetermined control.

Specifically, for example, the microcomputer 308a causes the cam shaft 303 to further rotate from a state where the objective lens group 330 is disposed at a telephoto end or a wide angle end so that the light-shield plate 320 is caused to move to the light-shield position. Thus, the photographer can recognize that the magnification (zoom) that has been set in the lens unit 200 with the zooming ring 213 of the lens unit 200 exceeds the upper limit of the magnification (the focal length) that is capable of being set in the objective lens group 330 of the optical viewfinder 300.

In addition, the microcomputer 308a receives display image data generated in the camera controller 140, and displays the received display image data on the EVF panel 307. This process can cut off outside light, and thus, a live view displayed on the EVF panel 307 can clearly show a subject image without overlapping with an optical image.

For example, the microcomputer 308a may stop driving of the cam shaft 303 with the light-shield plate 320 being held at the retracted position and the objective lens group 330 being located at the telephoto end or the wide angle end according to the magnification set in the lens unit 200. In this case, the microcomputer 308a displays at least the photographing frame 420 and displays no image data on the EVF panel 307. This configuration allows a subject image (an optical image) of an OVF to be clearly observed without overlapping with a live view displayed on the EVF panel 307.

In a situation where the objective lens group 330 moves to the telephoto end and then the lens unit 200 moves toward a telephoto side, the photographing frame 420 changes the size of the photographing frame 420 according to the zoom position set with the zooming ring 213 of the lens unit 200, thereby continuing observation of the photographing frame with the OVF.

Then, when setting of the magnification (zoom) of the zooming lens group 210 falls within the range of the magnification (zoom) that is capable of being set by the objective lens group 330 again, the microcomputer 308a moves the light-shield plate 320 to the retracted position, and based on a control signal received from the camera controller 140, sends a drive control signal to the stepping motor 305 and adjusts the magnification of the objective lens group 330.

[3-5. Parallax Correction]

Figure 7A:
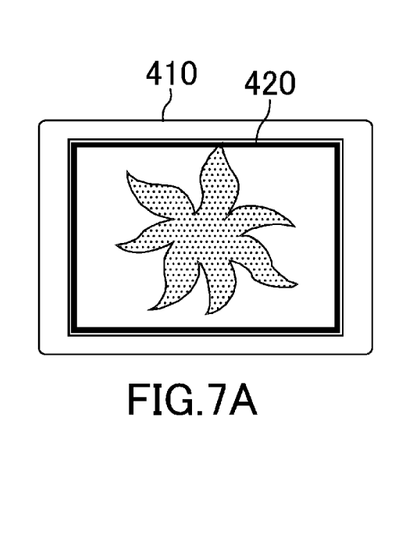
FIGS. 7A-7C illustrate parallax correction in the embodiment.
Figure 7B:
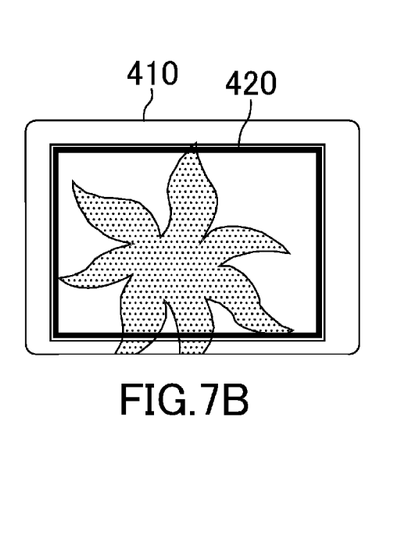
Figure 7C:
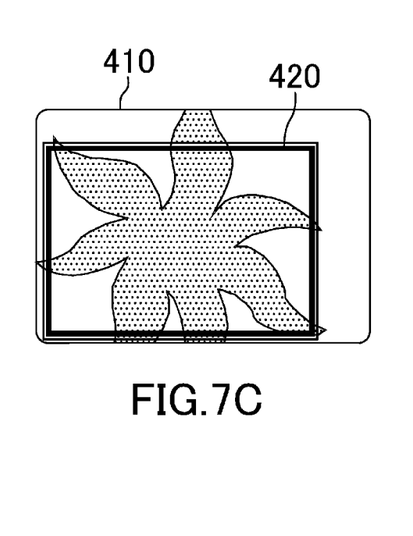

A parallax occurs between closely adjacent images due to a misalignment of the optical axis of the lens unit 200 and the optical axis of the optical viewfinder 300 attached to the camera body 100. The optical viewfinder 300 of this embodiment is capable of performing parallax correction. This parallax correction will now be described in detail with reference to FIGS. 7A-7C. FIGS. 7A-7C illustrate the states of the display frame 410 and the photographing frame 420 when the position (the magnification) of the zooming lens group 210 of the lens unit 200 is adjusted from a wide angle side in FIG. 7A to a telephoto side in FIG. 7C.

First, as illustrated in FIG. 7A, since a small amount of parallax occurs in the wide angle side, the microcomputer 308a displays the photographing frame 420 substantially at the center of the display frame 410.

Then, as illustrated in FIGS. 7B and 7C, when the position of the zooming lens group 210 moves to the telephoto side, the amount of parallax gradually increases, and the photographing frame 420 shifts from the display frame 410. Thus, when a subject distance falls below a predetermined distance, the microcomputer 308a moves the location of the photographing frame 420 within the display frame 410 according to the subject distance to correct the location of the photographing frame 420.

In this manner, even when the position (the magnification) of the zooming lens group 210 is set at the telephoto side, the photographer can take a picture while checking the photographing frame 420 that is a range actually captured.

To display a live view image on the EVF panel 307, the microcomputer 308a drives the objective lens group 330 of the optical viewfinder 300 to the telephoto end or the wide angle end with the stepping motor 305, and rotates the cam shaft to rotate the light-shield plate rotation shaft 320a so that the light-shield plate 320 moves to the light-shield position. In this manner, outside light is cut off, thereby allowing a subject image (an optical image) of the OVF to be clearly observed without overlapping with a live view displayed on the EVF panel 307.

4. Advantages of Embodiment

As described above, in the optical viewfinder 300 of this embodiment, the microcomputer 308a displays at least the photographing frame 420 on the EVF panel 307, and controls driving of the objective lens group 330 according to the zooming lens group 210 of the lens unit 200. In this manner, the photographer can take a picture while checking a subject image of the optical viewfinder 300 at the zoom position that has been set with the zooming ring 213 of the lens unit 200 and the photographing frame 420 through the eyepiece lens group 301f. Accordingly, the photographer can take a picture of a subject with excellent visual recognition. In addition, since the subject image is observed with the optical viewfinder, high followability of a moving object can be obtained. Furthermore, since the visual field frame 310g is wider than the photographing frame 420 of the lens unit 200, the periphery of the photographing frame 420 can be observed in the display frame 410. This configuration enables photographing with prediction of movement of a moving object, e.g., entering of the moving object into the photographing frame.

When the subject distance falls below a predetermined distance, the microcomputer 308a moves the location of the photographing frame 420 within the display frame 410 according to the subject distance to correct the location of the photographing frame 420. That is, the optical viewfinder 300 of this embodiment is configured to perform parallax correction. Thus, in a situation where the position (the magnification) of the zooming lens group 210 is at the telephoto side, the photographer can take a photograph while checking the photographing frame 420 that is a range actually captured.

In this embodiment, the roof prism 301c and the first and second prisms 301d and 301e are used as prisms. Alternatively, prisms may be obtained without using the roof prism 301c, e.g., a porro prism. A system using a roof prism is suitable for the case of requiring size reduction, and a porro prism is advantageous for its easiness in formation.

In the objective lens group 330 of the optical viewfinder 300, the first zoom lens 301a and the second zoom lens 301b cooperate to perform scaling operation. Alternatively, scaling operation may be performed by moving one of the first zoom lens 301a or the second zoom lens 301b along the optical axis (AZ).

As described above, the embodiment has been described as an example of the technique of the present disclosure. The attached drawings and detailed description are provided for the embodiment.

Accordingly, the components shown in the attached drawings and detailed description may include unnecessary components as well as component necessary for solving the problems. Thus, these unnecessary components should not be defined as necessary component merely because of inclusion in the attached drawings and the detailed description.

While the technique of the present disclosure has been illustrated and described in the foregoing embodiment, various changes, substitutions, additions, and omissions may occur in the scope of the claims and their equivalents.

The present disclosure is suitable for imaging apparatus with interchangeable lenses and imaging systems, e.g., digital cameras with interchangeable lenses.

What is claimed is:

1. An optical viewfinder configured to be attached to a camera body with an interchangeable lens, the optical viewfinder comprising:
   a Keplerian viewfinder optical system including a scalable objective lens group;
   a drive source configured to drive at least one objective lens of the objective lens group along an optical axis;
   a detector configured to detect a position of the at least one objective lens;
   a control circuit configured to control driving of the drive source based on a result of detection by the detector;

an electric contact configured to be electrically coupled to the camera body;

a visual field frame disposed on a focal plane of the objective lens group, and wider than a photographing frame of the interchangeable lens that is to be attached to the camera body;

a display device optically equivalent to the focal plane when viewed from an eyepiece lens of the camera and located at a position different from that of the visual field frame; and a communication unit configured to receive information on a focal length of the variable focal length lens through the electric contact from the camera body, wherein when a variable focal length lens is attached to the camera body as the interchangeable lens, the control circuit controls driving of the drive source to adjust a magnification of the objective lens group based on information on a focal length of the variable focal length lens received by the communication unit, and displays at least the photographing frame on the display device.

2. The optical viewfinder of claim 1, wherein when a subject distance falls below a predetermined distance, the control circuit moves a position of the photographing frame on the display device according to the subject distance, in order to perform parallax correction.

3. The optical viewfinder of claim 1, further comprising a DC-to-DC converter configured to perform DC-to-DC conversion on a power supply voltage received from the camera body and to generate a predetermined power supply voltage, wherein the control circuit and the drive source receive the power supply voltage from the DC-to-DC converter.

4. The optical viewfinder of claim 3, wherein the DC-to-DC converter receives the power supply voltage from the camera body through a general-purpose X contact terminal in the camera body.

5. The optical viewfinder of claim 1, wherein the optical viewfinder is configured to be attached to a general-purpose hot shoe of the camera body.

6. The optical viewfinder of claim 1, wherein the electric contact is electrically coupled to the camera body through a communication contact for an external flash device in the camera body.

7. The optical viewfinder of claim 1, wherein the drive source is a stepping motor.

8. The optical viewfinder of claim 1, wherein electric power and a video signal for use in the display device are received through an electric contact except a communication contact for an external flash device and an X contact terminal.

9. The optical viewfinder of claim 1, wherein electric power for use in the display device and the control circuit is received through an electric contact except a communication contact for an external flash device and an X contact terminal.

10. The optical viewfinder of claim 1, wherein the display device optically equivalent to the focal plane and located at the position different from that of the visual field frame is an EVF display device.

11. The optical viewfinder of claim 10, further comprising a light-shield plate moveable between a light-shield position at which incident light that has passed through the objective lens group is blocked and a retracted position at which passage of the incident light is allowed, wherein the control circuit moves the light-shield plate to the retracted position when the focal length of the variable focal length lens is within a focal length range that is capable of being set by the objective lens group, and the control circuit moves the light-shield plate to the light-shield position and displays a video signal from the camera body on the EVF display device when the focal length of the variable focal length lens is out of the focal length range that is capable of being set by the objective lens group.

* * * * *